United States Patent [19]

Baer

[11] 4,071,918
[45] Feb. 7, 1978

[54] METHOD OF PRODUCING DRILL SCREWS

[75] Inventor: Martin Alfred Baer, Niles, Ill.

[73] Assignee: Illinois Tool Works Inc., Chicago, Ill.

[21] Appl. No.: 739,897

[22] Filed: Nov. 8, 1976

[51] Int. Cl.$^2$ .............................................. B23G 9/00
[52] U.S. Cl. ......................................... 10/10 R; 10/9;
10/20.5; 10/21; 90/11.44
[58] Field of Search ................... 10/4, 6, 9, 10 R, 20.5,
10/21, 27 R, 31, 59; 76/101 B; 85/41, 47;
90/11.44

[56] References Cited

U.S. PATENT DOCUMENTS

| | | | |
|---|---|---|---|
| 2,479,730 | 8/1949 | Dewar | 85/47 |
| 2,590,597 | 3/1952 | Brown | 10/20.5 X |
| 3,085,264 | 4/1963 | Stern | 10/20.5 X |
| 3,164,851 | 1/1965 | Hanneman | 10/10 R |
| 3,280,412 | 10/1966 | Hanneman et al. | 10/20.5 X |
| 3,422,472 | 1/1969 | Pomernacki | 10/10 R |
| 3,585,665 | 6/1971 | Jackson | 10/6 |
| 3,780,389 | 12/1973 | Lindstrom | 10/21 |
| 3,933,075 | 1/1976 | Peterson | 85/41 |

Primary Examiner—E. M. Combs
Attorney, Agent, or Firm—Thomas W. Buckman; Robert W. Beart

[57] ABSTRACT

The method includes positioning a plurality of rotary milling saw stations about a path of travel for successive screw blanks. Two longitudinally overlapping fluting cuts are made on each side of each blank to configure a drilling point. The blanks are rotated about their axis a predetermined amount, during travel between work stations, to expose the appropriate peripheral surface of the blank to the appropriate work station. The method and apparatus described in the invention is capable of producing a drill screw with relatively long flutes behind the cutting edges while not appreciably weakening the point structure. The turret carrying the blanks is intermittently indexed in timed relationship with the activation of the milling saw, the work stations and means to clamp the blanks at the work stations.

6 Claims, 26 Drawing Figures

METHOD OF PRODUCING DRILL SCREWS

BACKGROUND OF THE INVENTION

The present invention relates generally to milling machines for producing drill screws and methods for producing such products through successive operations of rotary-type saws on a screw blank.

Certain prior art apparatus and methods have been suggested and utilized for producing drill screws and while they have been generally successful and have enabled a commercially accepted drill screw to be provided, the present application contemplates further improvements for facilitating production, minimizing manufacturing costs and providing screws having a more efficient drilling action. The device described in U.S. Pat. No. 3,125,923 typifies the present commercially successful drill screw. The increasing and varying demands for drill screw products requires methods and equipment that are extremely versatile. For example, current drill screw applications include those requiring a long flute length, to be capable of properly drilling into thick materials.

Prior art methods and apparatus for forming drill screws typically utilize saws with a predetermined minimum diameter. For example, a three inch diameter saw is commonly used. This relative size of saws is preferred since the saws themselves are expendable items and are contributory to the cost of production of the drill screws. Furthermore, the saws must periodically be sharpened and it has been found that the particular size saws currently utilized are most efficiently sharpened.

However, the use of such conventional rotary saws creates certain inherent limitations in the methods and apparatus known heretofore. The operations performed to mill the flutes in the blanks include the formation of intersecting arcuate flute surfaces and flat flute surfaces for each flute, with the length of the arcuate surface determining the effective flute length of the drill screw. To maximize the flute length for a given saw diameter, the saw must substantially penetrate the transverse cross section of the blank. This substantial penetration obviously weakens the drill point behind the cutting edges due to the overlapping of saws when forming oppositely disposed flutes. This condition is amplified when a positive axial rake angle is required behind the laterally extending cutting edges. The penetration of each fluting cut an amount greater than half the diameter of the blank at the region of intersection of the positive rake angle surfaces will create a through transverse hole in the shank which is highly undesirable.

Currently successful prior art methods and machinery contemplate either intermittently indexing blanks along a circular path or continuously moving blanks along a circular path. In the intermittent type methods, as typified in U.S. Pat. No. 3,280,412, the blanks are clampingly secured in circumferentially spaced pockets in a turret, preventing the blanks from rotating about their own axis as they are indexed to three different work stations surrounding the circular path. A first work station performs fluting cuts on both sides of the blank simultaneously. Second and third work stations create bevel surfaces on the extremity of the blank to form laterally extending cutting edges intersecting the flute surfaces.

The continuous feed apparatus as typified in U.S. Pat. No. 3,422,472 utilizes a pair of fluting saws at different positions about a circular path created by a turret but contemplates the engagement of the fluting saws with the blank as the blanks themselves are fed past the work station. A pair of pointing saws are also accurately positioned about the circular path to form bevel surfaces on the extremity of the blank, and the blanks themselves are rotated about their own axis between the work stations just described.

Certain other methods have been devised in an effort to produce an improved performance drill screw through the use of a rotary milling cutter apparatus. For example, U.S. Pat. No. 3,780,389 contemplates the orientation of the rotary milling cutter relative to the blank in such a manner so that the generally arcuate flute surfaces extend above and form the laterally extending cutting edge. This design enables a positive rake to be formed behind the cutting edge without fear of overlapping cutters but decidedly limits the effective flute length which can be produced for a commonly used and conventional cutting saw.

The performance and efficiency of drill screws manufactured with the abovementioned milling operations are measured and evaluated by a number of parameters, including the following: the amount of axial pressure required to effect a drilling operation, the time required to drill a hole, the length of flute required to properly exhaust chip material, the configuration and length of the chips produced during drilling, the thickness of the web or column of material remaining between the flute surfaces at a given distance behind a chisel edge, the length of the chisel edge itself, the axial rake angle provided by the flute behind the cutting edge, the amount of relief behind the cutting edge as defined by the location of intersection of the flat beveled surfaces with the flute surfaces opposing the cutting edges. While the prior art methods have produced commercially acceptable drill screws in an efficient and commercially sound manner, in many cases, a compromise of one or more of the above listed parameters has been required because of the lack of versatility of prior art methods and/or machines.

SUMMARY OF THE INVENTION

It is, therefore, an object of the invention to provide a method and apparatus for producing drill screws with increased effective flute length.

Another object of the invention is to provide a method and apparatus for producing critically engineered drill screw products.

Yet another object of the invention is to provide an apparatus which indexes successive screw blanks about a single circular path presenting different predetermined regions of the blanks for milling operations at a plurality of work stations, including four fluting stations.

Still another object of the invention is to provide a method of forming drill points on a screw blank with a rotary milling cutting operation which maximizes the saw life and which provides clean, burr free surfaces and cutting edges on the blank.

An advantage of the apparatus of the present invention is the accuracy which can be obtained in the manufacture of drill screws of the type described at least in part due to the novel clamping and hold down devices incorporated therein.

A still further advantage of the method and apparatus described herein is the capability to accurately form, by a milling saw operation, the drill point on a blank without compromising the several design parameters which in combination define an efficient drill screw.

These above objects are obtained primarily through an apparatus which includes a rotatable turret having a plurality of blank receiving pockets circumferentially spaced thereabout. A plurality of, preferably six, milling saw stations are spaced in predetermined locations around the turret and clamping rotatable spindle devices are located and fixed axially above the pockets in the turret for engagement with the heads of the blanks situated therein. The turret is intermittently indexed to present the blanks to each successive work station with the reciprocating cutting engagement of the saws at each work station being timed to be synchronous with the dwell period of the turret. In addition, the means indexing the turret also synchronously controls the rotation of the spindles to effect rotation of the blanks about their own axis as they are conveying from one work station to the other in order to present the desired, predetermined surface of the blanks at the next fluting or pointing station.

Briefly, the method incorporates the formation of two longitudinally overlapping flute surfaces on each side of the blank with such fluting operations accomplished at four distinct cutting stations.

The two overlapping fluting cuts on each side of the blank will provide a drill screw with a greatly increased effective flute length while not compromising the back of point strength, chisel edge, length optimization or rake angle requirements for the application.

The fluting operations are performed with techniques which maximize saw life and provide a clean and burr free drill point configuration. For example, the fluting saws are fed into the blank at a slightly skewed angle to the direction of the feed, thereby producing a flute which has a pair of surfaces intersecting at an angle slightly greater than 90°. The skewed feed of the saw will provide adequate relief behind the cutting edge of the saw. The increased included angle of the flute surfaces reduces the probability that the heel, or region on the flat beveled surface circumferentially behind the cutting edge, will drag during the cutting operation. Such a skewed fluting cut will also result in a much cleaner removal of material.

In addition to the skewed cut of the fluting saws, the present invention contemplates rotating the uppermost flute cutting saw so as to cut downwardly on the shank. The lowermost flute cutting saw is rotated so as to cut upwardly on the shank. This sequence and relative rotation between the saws and the blank eliminates the burrs that would be formed in the critical regions of the drill point.

The fluting and pointing operations accomplished by the method and apparatus described herein and utilizing the accurately timed relationship between the rotation of the blank between the stations and the location of the stations relative to the turret produces a drill screw which is stronger than and capable of exhausting chip material for thicker materials more efficiently than prior art screws.

An upstanding transverse ridge in the flute surface opposing the cutting edge serves as a chip breaker surface. The drill screw resulting from the method and apparatus of this invention also will have a minimized chisel edge which results in a more efficient drilling operation.

Other objects and advantages of the invention will become apparent from the following description and the accompanying drawings.

DETAILED DESCRIPTION OF THE PREFERRED EMBODIMENT

Referring now to the drawings more in detail wherein like numerals have been employed to designate similar parts throughout the various views, it will be seen that the disclosed embodiment includes a fixed supporting structure upon which a rotary turret is mounted for intermittently conveying a succession of blanks to six work stations mounted on the support structure. The method described herein and the apparatus contemplated to perform the method utilizes two longitudinally overlapping saw cuts on opposed peripheral regions on the blank, creating a relatively long flute area. The longitudinally overlapping flutes are formed by four fluting stations while the remainder of the drill point configuration is formed by the remaining two pointing stations.

METHOD AND SEQUENCE OF CUTTING OPERATIONS

Figures 1, 2, 3, 4, 5, 8:
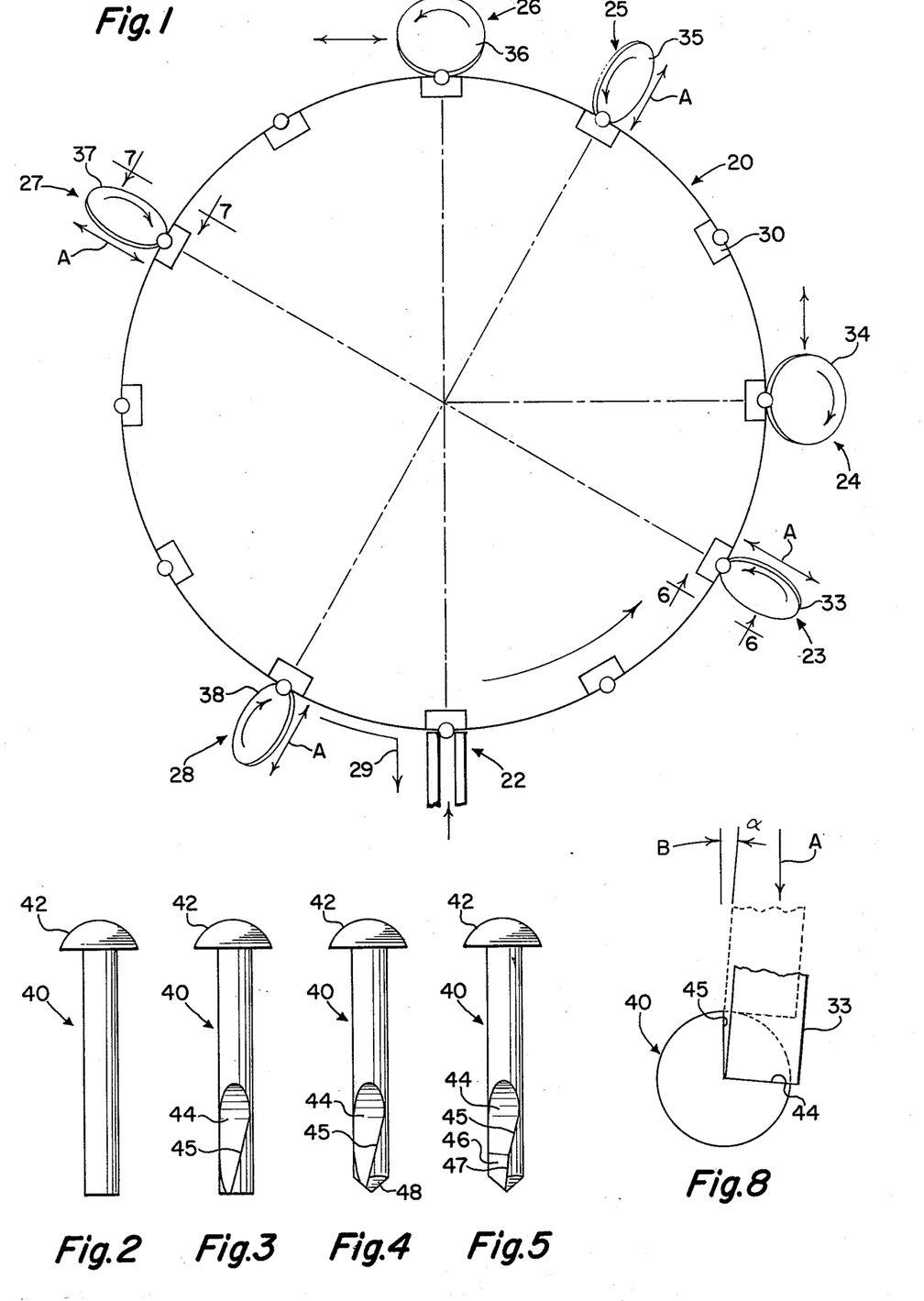
FIG. 1 is a schematic plan view showing the manner in which screw blanks are advanced from a loading station to a plurality of work stations.
FIGS. 2-5 are elevational views of the blanks as they are configured following several work stations.
FIG. 8 is an enlarged fragmentary schematic view as taken along lines 8—8 of FIG. 6 showing the skewed feeding motion of the fluting saws.

Referring now to FIG. 1 it will be seen that a rotary turret 20 is provided with 12 equally spaced pockets 30 opening to the periphery of the turret and adapted to receive a succession of screw blanks 40. The turret 20 is intermittently indexed in a manner to be described in more detail herein so as to present the pockets at a succession of seven operating stations. Stations 22, 23, 24, 25, 26, 27 and 28 are located adjacent the circular path of travel of the turret at predetermined circumferentially spaced positions on the structure supporting the turret. Station 22 incorporates the feeding and loading mechanisms designed to place a succession of blanks in the pockets 30. A first station 23 creates a first, generally longitudinally directed fluting cut on a screw blank. Station 24 creates a beveled pointing cut on the extremity of the screw blank. Station 25 creates a generally longitudinally extending fluting cut in the same axial location of the blank as that performed by station 23 but on the opposite peripheral segment of the blank. Station 26 creates a beveled pointing cut on the extremity of the blank forming an equal but oppositely extending flat surface relative to that formed by station 24. Stations 27 and 28 form a final fluting cut, longitudinally overlapping with the first fluting cuts on each side of the blank. Region 29 intermediate station 28 and loading station 22 effects the unloading of the finished blanks into an appropriate receptacle.

Figure 6:
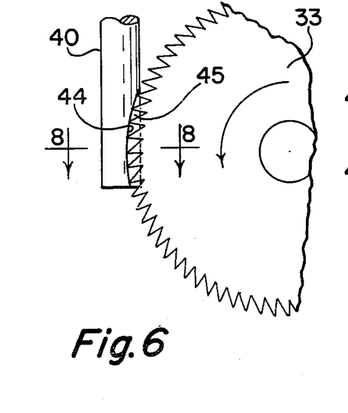
FIG. 6 is an enlarged fragmentary schematic view as taken along the lines 6—6 of FIG. 1 and showing the manner in which the upper fluting saw engages the screw blank.

The successive configurations of the extremities of the blanks 40 as they are indexed around the circular path is shown in FIGS. 2-5. Each blank has a radially enlarged head 42 and an elongated shank. Work station 23 will include a rotary cutting saw 33 mounted for reciprocation into and out of intersection with the rotary path created by the turret 20. Fluting saw 33 is inclined a predetermined angle with respect to the axis of the screw. An angle of inclination of 12° has been found to be acceptable for saws 33 and 35. The cutting engagement of the rotary saw 33 with the exposed extremity of the blank is shown in FIG. 6. This first fluting cut creates a pair of intersecting flute surfaces 44 and 45 with the generally flat surface 45 inclined at the predetermined angle to the vertical axis of the blank. The circular configuration of the saw 33 creates generally arcuate surface 44 intersecting the flat surfaces. The slot resulting from the first work station 33 is shown in FIG. 3. The work station 25 with saw 35 is identical to station 23, with the same configuration of flute surface being formed on the peripheral segment opposing the surface exposed to first station 23.

Pointing stations 24 and 26 create equal, intersecting flat beveled surfaces 48 at the extremity of the blank. The blank configuration as shown in FIG. 4 is that immediately following the last pointing cutting operation at work station 26.

Figure 7:
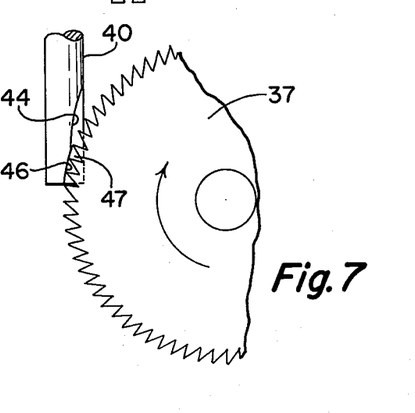
FIG. 7 is an enlarged fragmentary schematic view as taken along the lines 7—7 of FIG. 1 showing the manner in which the lower fluting saw engages the screw blank.

Work stations 27 and 28 perform another fluting cut on the blank which longitudinally overlaps and is generally a longitudinal continuation of the fluting cut performed at work stations 23 and 25. However, the saws 37 and 38 are inclined at an angle less than that of the saws 33 and 35. For example, an angular inclination of 9° has been found to be sufficient at the lower fluting stations 27 and 28. A representation of the cut performed at the lower fluting stations by saws 37 and 38 is shown in FIG. 7. As at the upper fluting stations 23 and 25, the rotary saws 37 and 38 create a substantially flat flute surface 47 intersecting with an arcuate surface 46.

In accordance with a further aspect of the invention, the rotary saws 33 and 35 creating the uppermost fluting cuts are rotated in a counterclockwise direction or in a direction that cuts downwardly on the shank. This cutting action is shown in FIG. 6. In contrast to this downward cutting action, the final or lower fluting cuts performed by saws 37 and 38, shown in FIG. 7, are created during clockwise rotation of these saws cutting upwardly on the shank. This combination of cutting actions results in a drilling tip which is relatively free of burrs which would ordinarily be created by the milling or sawing cuts using conventional drill screw manufacturing techniques. The critical cutting edge regions are burr free in the drill screws produced by this invention.

A further, important relationship of the fluting saws 33, 35, 37 and 38 to the screw blank is shown in FIG. 8. Each of the fluting saws is mounted at a work station for reciprocating movement into and out of cutting engagement with the blanks. This movement is in a path as shown by the arrow A in FIGS. 1 and 8. The disc-like rotary cutting saws, however, are mounted to be disposed at an acute angle to an imaginary plane B which extends through the central axis of the turret and through the central axis of each of the blanks 40. Planes A and B are parallel and FIG. 8 shows a skew angle $\alpha$ of 2°-5° formed between the side surface of the saw and imaginary plane B. Fluting saws 33, 35, 37 and 38 are slightly skewed relative to their path of reciprocal travel and to the radial plane extending through the axis of the blank. It should be apparent that the slot created by this cutting action will be such that intersecting flute surfaces 44, 45 as well as 46, 47 are disposed at an angle greater than 90° to one another. More importantly, the flat side surface of the cutting saw 33 will be relieved an angle $\alpha$ as it plunges into the blank. It has been found that such a cutting action results in a prolonged saw life as well as a much cleaner cut. This skewed relationship, of course, may be utilized in both the upper and lower fluting cutting stations without affecting the inclination of the fluting saws to the longitudinal axis of the blanks.

In order to accurately form the various surfaces comprising an effective drill point, the proper predetermined segment of the blank must be exposed to the appropriate work station. It has been found that the blanks should be securely clamped from movement during each of the cutting operations while the turret is in a dwell condition but must be rotated about their axis during movement from one work station to the next.

In the present invention, the work stations are positioned to be circumferentially spaced from each other by 30° or multiples of 30° around the circular path created by the turret. In the preferred embodiment, shown schematically in FIG. 1, the first, upper, fluting station 23 is located 60° from the loading station 22; the first pointing station 24 is located 90° from the loading station; the second, upper, fluting station 25 is located 150° from the loading station; the second pointing station 26 is located 180° from the loading station; the first, lower, fluting station 27 is located 240° from the loading station and the second lower fluting station 28 is located 330° from the loading station. In conjunction with the above preferred relative location of all of these work stations, it is important that the rotation of the blanks about their axis be accurately timed and coordinated with the location of these work stations. In the preferred embodiment of the invention, the blanks are rotated an amount equal to 300° in a given direction for each 30° increment of rotation of the turret. It has been found that a sun and planetary gear arrangement with a 10 to 1 ratio will produce the required accurate relative rotation of the blanks to achieve the desired surface exposed at each work station.

The above described arrangment will permit the driver bits to properly seat or matingly engage with any configuration of driving surface on heads 42. The rotation of the drivers and blanks about their axis an amount greater than 360° prior to the operative engagement of the first cutting saw is an important feature in controlling the accuracy of the points configured according to this invention since this feature will insure firm mating interengagement of the driver bits with the driving surfaces of the heads.

Figures 9, 10, 12:
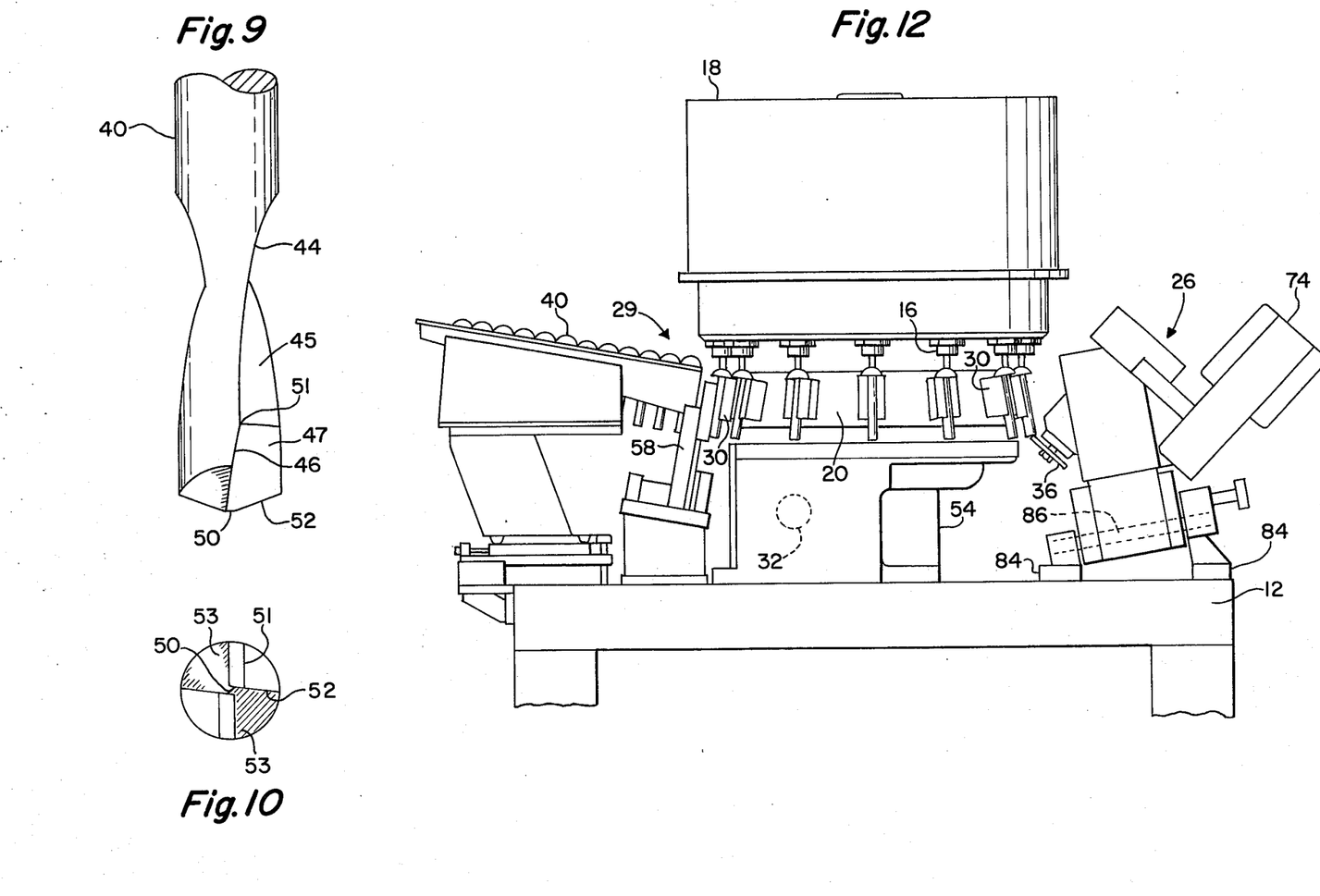
FIG. 9 is an enlarged fragmentary elevational view showing the drill tip resulting from the method and apparatus of the invention.
FIG. 10 is an end view of the drill tip shown in FIG. 9.
FIG. 12 is a simplified elevation view of the apparatus as taken in the direction of lines 12—12 of FIG. 11 and deleting the stations intermediate the loading station 22 and pointing station 26.
Figure 11:
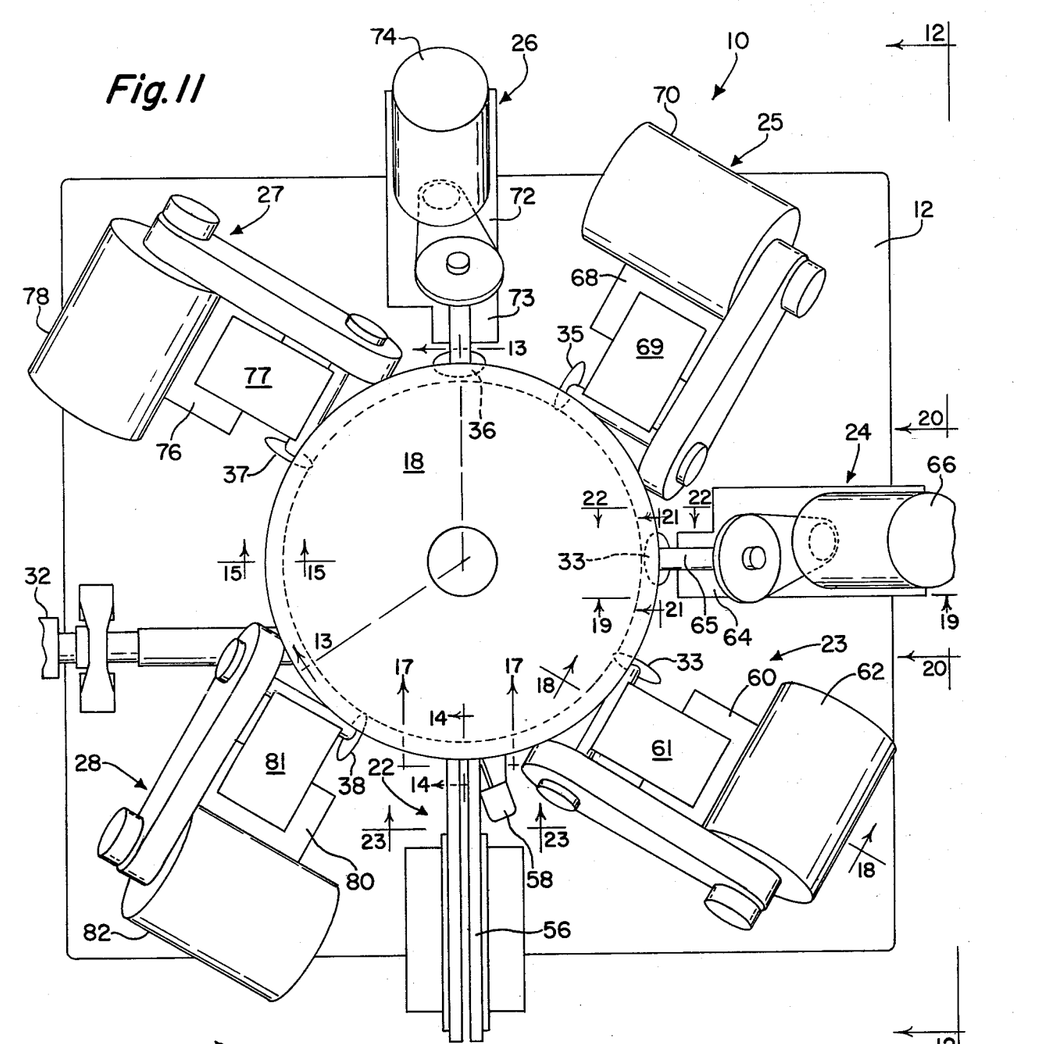
FIG. 11 is a simplified top plan view of the apparatus incorporating the features of this invention.

FIGS. 9 and 10 will describe more in detail the drill tip configuration resulting from the method just described. Each flute thus configured will have a pair of intersecting generally longitudinally extending flat surfaces with the lowermost surface 47 disposed at a predetermined angle, for example 9°, to the vertical axis of the blank, and the uppermost flat surface 45 disposed at a greater predetermined angle, for example 12°. The arcuate flute surfaces 44 and 46 will longitudinally merge creating an upstanding transverse ridge 51 disposed above the laterally extending cutting edges 52. The flat bevel surfaces 48 formed on either side of a chisel terminal edge 50 create the proper relief behind each of the cutting edges. It should be noted that each flat surface 47 and cutting edges 52 formed thereby, transverse the chisel 50 so as to intersect both bevel surfaces 48. The cutting edges will extend at an angle of not greater than 45° to the chisel edge 50. Ridge 51 will create a chip breaking effect which becomes important in going through thicker materials. In contrast with the drill tip typified by the U.S. Pat. No. 3,125,923, the effective flute lengths of the screw produced for a given blank size by this invention will be longer and the drill tip stronger since the increased length of flute does not compromise the web thickness or thickness of the column of material between flute surfaces at a given axial location above the point. As noted in the background of the invention, prior art screws tended to be weak behind the point when a positive rake or a longer flute was desired. As shown in the end view of FIG. 10, the intersecting surfaces 46 and 47 forming each of the flutes adjacent the cutting edges are arranged at an angle of approximately 92°–97° to one another. This relationship has the effect of reducing the tendency of the heel areas 53 to hinder efficient drilling by not providing the proper relief behind the cutting edges. In addition, the lowermost fluting cut producing surfaces 47 and 46 in each flute effectively reduces the length of the chisel 50. Thus, an accurately configured long fluted drill point is produced without compromising the many parameters considered to produce an efficient drill screw.

GENERAL ASSEMBLY OF THE APPARATUS

An apparatus 10 as shown in FIGS. 11–14 of the drawings incorporates a fixed table-like structure 12 upon which is mounted the loading station 22, upper fluting stations 23 and 25, pointing stations 24 and 26 and lower fluting stations 27 and 28. An unloading station 29 located between station 28 and station 22 is shown in FIG. 1 but not shown in detail because a known construction for off-loading blanks can be utilized with this invention. A turret 20 is mounted for rotation relative to the fixed support and is configured so as to present an outer peripheral surface frustoconical in configuration. The outer peripheral surface of the turret is provided with a plurality of, preferably 12, equally spaced blank receiving pocket means 30. Each of these pockets will include a generally elongated seat surface for receiving and supporting one side of the shank of a blank and exposing the opposite side for engagement by rotary cutting saws positioned at various stations spaced about the turret. The elongated seat surfaces formed by the pocket means 30 will be such as to dispose the axis of the shank outwardly relative to the vertical axis of the turret thus utilizing the force of gravity to seat and retain the blanks at each work station. A stationary support pedestal 54 is fixedly mounted to the table 12 supporting the rotary turret structure and a rotatable table or support housing 88 is mounted on the support pedestal 54 through the use of bearing members 89 and 87. An index drive plate 102 is fixedly mounted to the tubular stem of the rotatable table 88 for a purpose to be described later herein. An upper housing structure 106 is fixedly mounted to the top face of the rotary turret 20 and this top structure 106 supports and carries a plurality of clamping and blank rotating spindle devices 16. The number of spindles 16 should be equal to the number of pockets 30 and disposed axially above each of the associated pockets so that driver bit 116 can be operatively mated with the heads of each blank. Each of the cutting stations will typically include a rotary cutting saw mounted on a spindle which is driven by a suitable electric motor device. The saw, saw spindle, associated motor and interconnecting drive mechanisms are all mounted on a supporting base structure which is pivotally mounted to the work table 12 to effect a reciprocating movement of the rotating saw along a given path into and out of contact with a blank at each station.

The FIGS. 11–14 and the more detailed discussions of the mechanisms of each station in the assembly are schematic in nature and are not intended to be detailed engineering drawings and it should be apparent that one skilled in the art could readily understand the structure described herein as the description of the invention is considered.

The loading station 22 will include a feed rail device 56 which is inclined so as to be perpendicularly disposed to the peripheral surface of the frustoconical turret 20 and to the blank-receiving pockets 30. Thus, the loading of the blanks into the pockets is accomplished without requiring that they be cocked in the transition from the rail to the pockets. An appropriate escapement device in the form of holdback and feeding mechanism 58 is provided at the exit extremity of the inclined feed rail 56.

The first work station 23 includes the rotary fluting saw 33 for forming the upper fluting cut on one side of each blank. This saw is mounted on an appropriate support structure 61 carrying the spindle for the saw. The base 60 carries both the saw supporting structure 61 and the associated motor 70 and is pivotally mounted on the table 12 in a manner to be described in detail herein.

The second station 24 will include a pointing saw 34 mounted on a supporting structure 65 carrying the spindle for the saw. A base 64 carries both the saw supporting structure and associated motor 66 and is pivotally mounted on table 12 in a manner to be described in detail later herein.

The third station 25 including a second, upper fluting saw 35 with the associated saw mounting structure 69, base 68 and motor 70 is identical to the first station 23.

The fourth station 26 is a pointing station including a pointing saw 36 with associated saw mounting structure 73, base 72 and motor 74 and is identical to the second station 24.

The fifth and sixth stations 27 and 28 perform the lower fluting cuts and are substantially identical to upper fluting stations 23 and 25. Station 27 includes a fluting saw 37 mounted on a support structure 77. A base 76 carries both the saw supporting structure and associated motor 78. Base 76 is pivotally mounted on the table 12 in a manner to be described in detail later herein. Station 28 is identical to station 27 and includes a rotary saw 38 with associated saw mounting structure 81, base 80 and motor 82.

An appropriate blank unloading station 29 is utilized in the invention but the details of this station are not shown in that it should be apparent from the prior art how such a loading station is configured in an apparatus of this type.

TURRET INDEXING AND WORK STATION CONTROL

Figures 13, 14:
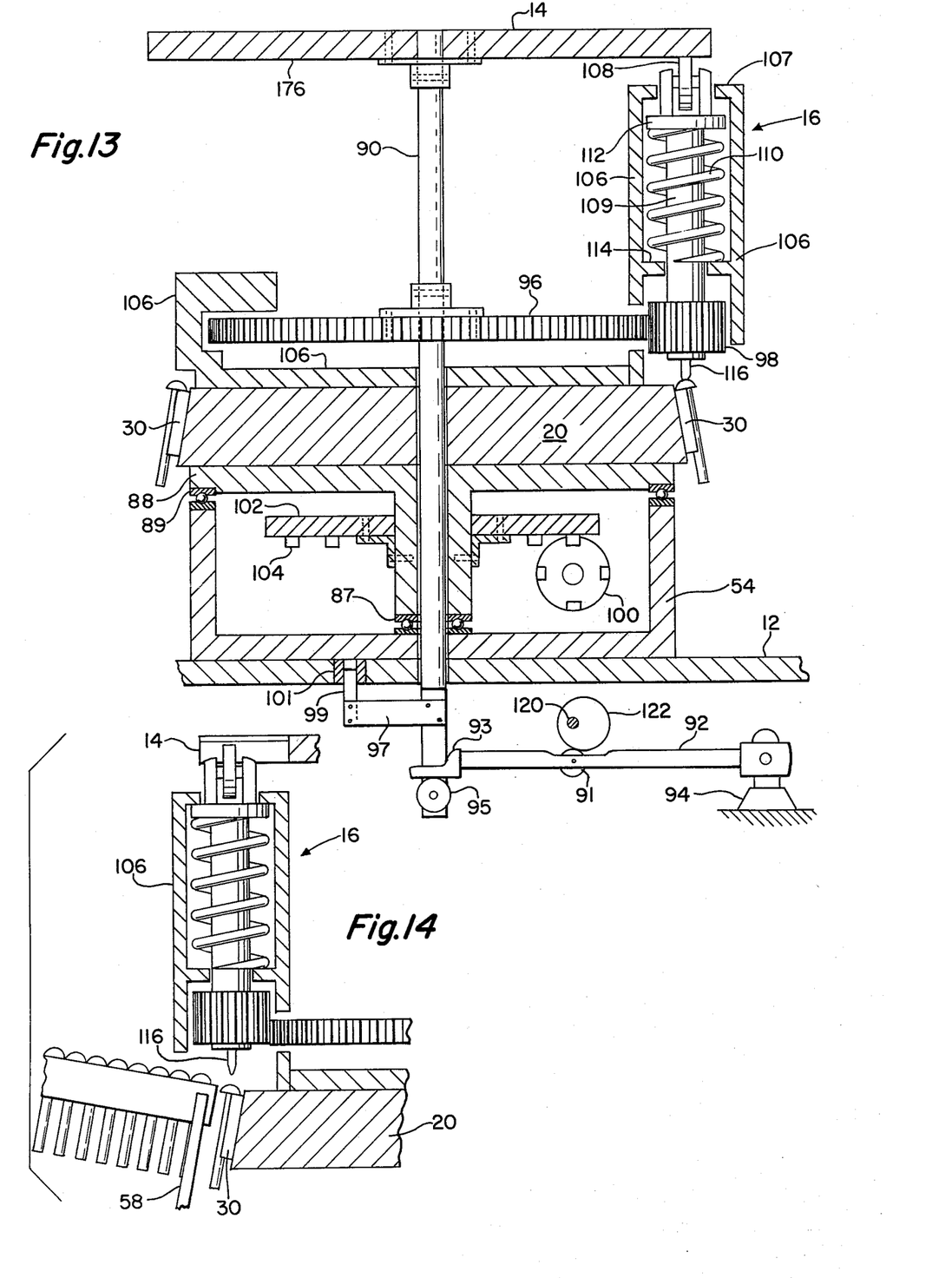
FIG. 13 is a simplified cross-sectional view as taken along lines 13—13 of FIG. 11.
FIG. 14 is an enlarged partial sectional view as taken along lines 14—14 of FIG. 11 showing the driver and clamping means at the loading station.
Figure 16:
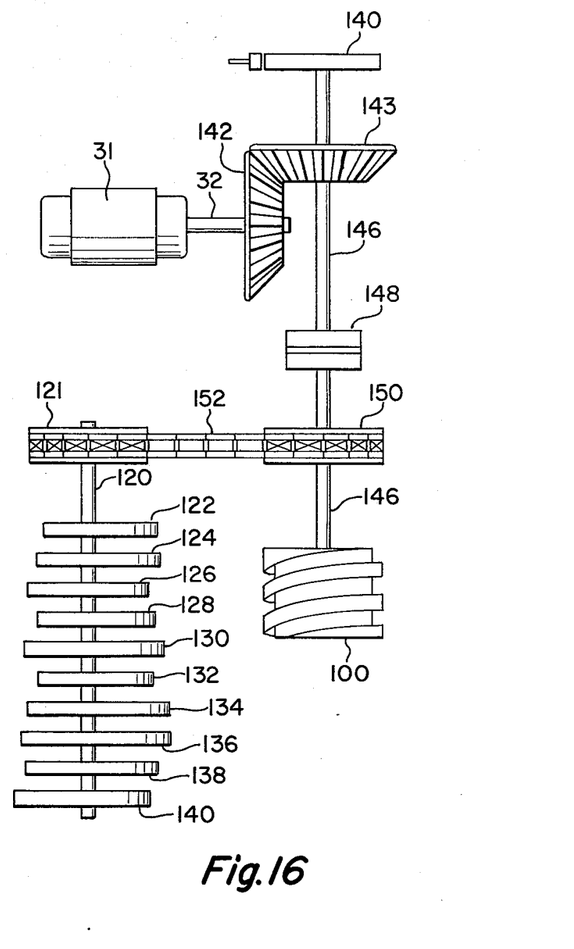
FIG. 16 is a semi-diagrammatic view of the drive mechanism and timing cams associated with the invention.

As best shown in FIG. 13, the turret 20 and spindle carrying structure 106 are adapted to be intermittently indexed through the use of a driving barrel cam element 100 and a driven index plate 102 carrying a plurality of cam followers 104. Such right angle indexing mechanisms are conventionally used to produce intermittent motion about a driven shaft. Index plate 102 is fixedly secured to a tubular portion of rotary support table 88 and disposed generally perpendicularly to the vertical axis of the turret. The turret 20 may thus be accurately intermittently rotated to a succession of peripheral work stations through the interengagement of cam 100 and cam followers 104. The driving and timing control mechanisms for the turret and the work stations are a series of accurately interrelated rotary cam surfaces mounted on a common cam shaft. Reference to FIG. 16 will show that a primary energy source, such as an engine 31, provides rotary input power to a shaft 32 which is transmitted to a primary drive shaft 146 through a right angle beveled gear set 142 and 143. A suitable brake 140 may be provided externally of the structure for safety purposes. An overload clutch 148 is disposed between the primary power input and the local drive elements. Power drive chain 152 interconnects sprocket 150 with sprocket 121 mounted on a cam shaft 120 and the rotary power is thereby transferred from the primary shaft 146 to the cam shaft 120. The driving barrel cam 100 is secured to the primary drive shaft 146 for its operative association with the indexing plate 102.

Each of the six sawing stations is controlled to move its associated saw into cutting engagement with the blank during the dwell period of the indexing turret. In addition to timing the reciprocating movement of the saw supporting structures, the common cam shaft 120 also carries several rotary cams which time the increase in clamping pressure exerted by the drivers at each station, control the blank loading apparatus, as well as control the mechanisms designed to create a lateral hold down pressure on the blanks at the pointing stations. In the embodiment described herein 10 different cams are shown, each controlling a separate mechanism in the apparatus. For example, cam 122 controls a cam plate 14 which periodically creates additional axial clamping pressure on the blanks. Cams 124 and 126 control the activation of the upper fluting stations 23 and 25. Cams 128 and 130 control the activation of the lower fluting stations 27 and 28. Cams 132 and 134 control the activation of the pointing saw stations 34 and 36. Cam 136 controls the escapement or loading device and cams 138 and 140 control the hold down devices which provide lateral pressure applied to the blanks at the pointing stations.

BLANK CLAMPING, ROTATION AND HOLD DOWN MECHANISMS

A better understanding of the devices utilized in this invention to secure the blanks in their respective pockets and to orient the proper predetermined segment of the blank extremity to the associated work station can be obtained with reference to FIGS. 13–15, 17, 21–23.

Upper housing section 106 carries a plurality of, preferably 12, driver or spindle units 16. Each of the drivers 16 is positioned to be in longitudinal alignment with the pockets 30. The axes of the driver units 16 are generally parallel to the longitudinal axis of the turret while the blank support surface created by the pockets 30 is inclined. This arrangement allows the spindles to exert force on the head of the blanks in a direction which inherently aids in holding the blank against the inclined seat surface.

The driving bit 116 associated with each driver unit 16 is in constant contact with the head of the blanks as they are conveyed about the circular path. Driving bit 116 is shown as including a cross blade configuration adapted to be complementary to a generally cruciform internal driving surface in the head 42. However, it should be apparent that any type of driving bit can be utilized to accommodate any one of a variety of head configurations. A variable clamping pressure is exerted downwardly on the blanks through a cam controlled mechanism shown in FIG. 13. A substantially circular cam plate 14 is secured at an upper extremity of a shaft 90 which extends through the vertical axis of the turret 20 and support pedestal 54. The shaft 90 and cam plate 14 are fixed from rotary motion but are adapted to reciprocate in an up and down axial motion relative to the turret. The reciprocable motion is provided through the use of a rotary plate cam 122 secured to the common cam shaft 120. A link 92, which is pivotally mounted at one end to a fixed pivot structure 94 and associated with the free extremity of shaft 90 at its other end with a U-shaped yoke 93 and carries cam follower 91 cooperating with cam 122. As the cam shaft 120 rotates, the cam 122 will periodically pull the shaft 90 and cam plate 14 down relative to the table 12 due to the downward force exerted on roller 95 fixed to shaft 90 by yoke 93. A large circular sun gear 96 is nonrotatably mounted on shaft 90 so as to be concentric with the turret for simultaneous driving engagement with all of the smaller planetary gears 98 mounted on each of the spindle units 16. The shaft 90 is secured from rotation by bar means 97 secured to a flat region of shaft 90. Bar means 97 is fixed to a square dowel 99 mounted for reciprocation in bearing means 101 in table 12.

Each of the 12 spindle units comprises a cam follower 108 rotatably mounted on the upper extremity of a shaft 109. The upper housing structure 106, which carries each driver about the circular path with the turret, includes a lower abutment surface 114 and an upper stop surface 107. A radially extending flange 112 integral with shaft 109 is positioned intermediate the shaft 109 and the cam follower 108. A relatively strong compression spring 110 is positioned about the shaft 109 and into abutting engagement with flanges 112 and 114 to exert a strong upward force on the spindle relative to the support structure. The spring 110, thus, acts as the force which returns the shaft 90 and cam plate 14 to its upward position when the low profile of the rotary cam 122 is aligned with the link 92. In operation, the cam plate 122 rotates in timed relationship with the rotation of the turret so that at each dwell period of the turret the cam plate 14 is pulled downwardly causing the spindle 16 to move downwardly increasing the clamping pressure between the bits 116 and the heads of the blanks at each work station.

As the turret is rotated between work stations, upper support structure 106 carries the spindles around the vertical axis of the fixed sun gear 96. The interengagement of gear 96 with each of the planetary geas 98 causes the spindles to rotate about their own axis during movement from one station to the next. It has been found that a gear ratio of 10 to 1 between gears 98 and 96 creates the desired 300° rotation of the blank relative to a 30° rotation of the turret. Since the indexing mechanism 100 and 102 provides a dwell period at each work station, the blanks will be locked against rotation at the work stations.

Figure 15:
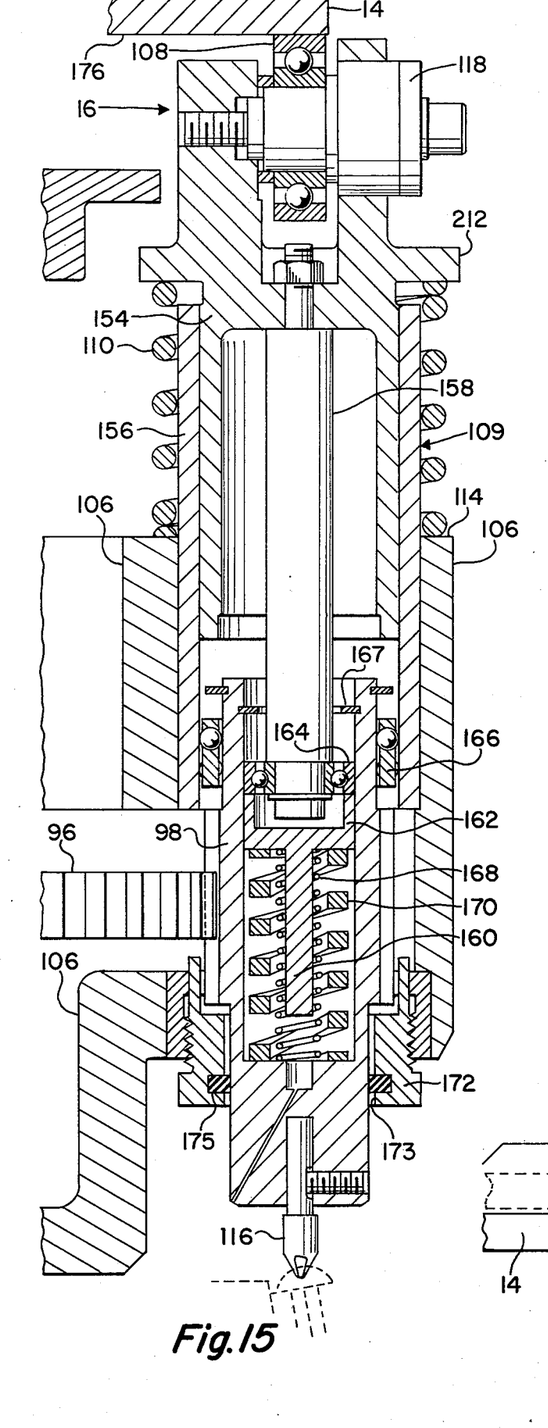
FIG. 15 is an enlarged partial sectional view as taken along lines 15—15 of FIG. 11 showing details of the driver and clamping means.

A more detailed description of a preferred embodiment of the spindles will be obtained with reference to FIG. 15. Since each of the spindles is identical, only one unit will be described in detail. The shaft 109 described broadly above may comprise an outer sleeve 156 fixed to the upper support structure 106 and a reciprocable tubular body 154 integral with the flange 112 and cam follower securement head. Tubular body 154 is telescopically mounted with outer sleeve 156. A shaft 158 is axially positioned with and secured to the tubular portion and extends downwardly for operative compressive engagement with a plunger 162. The plunger is reciprocably mounted within a lower tubular member 98. Lower tubular member 98 includes a plurality of axially extending splines on its external surface creating the planetary gear in operative engagement with sun gear 96. The lower end of tubular gear member 98 is provided with a bore for receiving the shank of a driver bit 116 retained therein by a set screw. Element 98 is mounted for rotation relative to the support structure 106 and shaft 150 by bearings 164 and 166 and is axially secured to support structure 106 by retainer nuts 172. A shaft 160 extends downwardly from the plunger head 162 and is encircled by a pair of springs. An innermost light, spring 168 and a heavier outer spring 170 is positioned between the head of the plunger and the base of the tubular bit carrying device 98. An adjustment eccentric 118 carrying the follower 108 permits the preload on spring 170 to be adjusted.

The bore 173 in retainer nut 172 is of a diameter sufficient to allow a certain amount of lateral movement of the tubular member 98 relative to the fixed structure. This structure in conjunction with the point contact provided by ball bushing 166 permits the bit to center itself to compensate for tolerances in the head configurations. FIG. 15 shows the spindle at the dwell period of the turret.

The axial positioning of cam plate 14 and control shaft 90 is timed to be in an upward position during the indexing of blanks from one 30° increment to the next. During this indexing period, the innermost spring 168 in the lower tubular member exerts a slight axial pressure on the bit carrying structure 98 which facilitates the rotation of the blanks about their axis between stations. When the turret is in its dwell period with a blank opposing a work station, the control cam 122 forces the cam plate 14 to move downwardly which, through the interaction of shaft 158 and plunger 162, causes the heavy spring 170 to exert a much greater force on the driver bit 116 to rigidly and securely retain the blank against rotation and against the pockets during the cutting operation. It has been found that an inner spring with a force of 5 pounds and an outer spring with a force of 250 pounds accomplishes the purposes of this invention.

Figure 17:
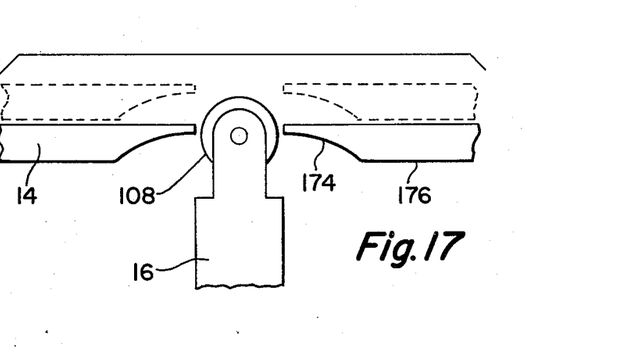
FIG. 17 is a fragmentary partial elevational view of the cam plate at the loading station and as taken in the direction of lines 17—17 of FIG. 11.

Cam plate 14 with a flat undersurface 176 acts on the spindle 16 through cam followers 108 to exert a longitudinal clamping pressure on the blanks at all positions along the circular path. However, it should be noted that the cam plate 14 is configured to have a discontinuity in the region immediately above the loading station 22. As shown in FIG. 17, the side view of the cam plate in this area comprises a tapered camming surface 174 leading to an aperture or slot 175 in the plate 14. The dotted line configuration of FIG. 17 shows this region of the cam plate during the indexing period of the turret. As shown in FIG. 14, this permits the driver spindle 16 to be forced upwardly under the compressive force of the spring 110 so that the driver bit 116 clears the blank receiving pocket 30 at the loading station 22, permitting entry of blanks into the rotary path. Snap ring 167 and bearing 164 cooperate to properly retract the driver bit 116.

In addition to the axial or longitudinal clamping pressure provided by the spindles at each work station, it may be advisable to provide a laterally directed hold down pressure against the shanks during each cutting operation. At each of the pointing stations 24 and 26, the blanks are laterally retained by a mechanism such as that described in FIGS. 21 and 22. The hold down mechanisms at these pointing stations are again timed to be synchronous with the cutting engagement of the cutting saws 34 and 36 during the dwell period of the turret. For this purpose, a pair of rotary plate cams 138 and 140 are secured to the common cam shaft 120. Since both of the pointing hold down stations are identical, only one of them will be described herein in detail.

A hold down finger 204 is mounted, in a manner which would facilitate longitudinal adjustment for different shank lengths, at the uppermost extremity of an oscillatory shaft 206 which extends through the table structure 12 and is supported therein by a sleeve bearing 208. The opposite or lower extremity of the shaft 206 is operatively secured to a laterally extending linkage 210 which in turn is secured to a generally horizontally extending linkage 212 which is pivotally secured to a cam follower linkage 214. The linkage 214 is pivotally secured to a stationary structure by a support means 216 so that the cam follower 218 is mounted on one side of the support means and the connection with linkage 212 is on the opposite side of the pivot support structure 216. A tension spring 220 is operatively connected to the extremity of linkage 214 opposite the cam follower 218, and resiliently secures linkage 214 to a stationary structure. In operation, the cam 138 is timed so that the low profile of the cam contacts the cam follower at the same time as the dwell period of the turret. Tension spring 220 thus causes the linkages to assume the positions shown in FIGS. 21 and 22 which create a lateral compressive force against the shank of the blank. During the indexing of the turret, the cam 138 causes the linkages to rotate the finger 204 outwardly from the turret permitting the next blank to be indexed for pointing operations by saws 34 and 36.

Figure 23:
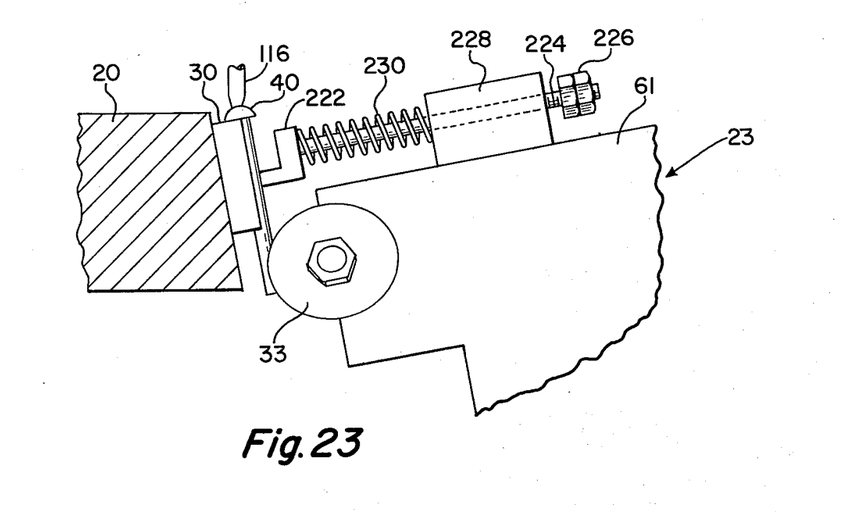
FIG. 23 is an enlarged schematic elevational view of a fluting station, as in FIG. 17, showing a hold down mechanism.

At each of the four described fluting stations, a blank hold down device may be mounted on the support structure carrying the saws 33, 35, 37 or 38. Since such a hold down structure may be identical in each of these four stations, only one such structure will be described in detail. With reference to FIG. 23, it will be shown that a stationary block 228 may be provided on saw support structures 61 so as to be located generally above the saws. The block is provided with a through bore into which a shaft 224 is positioned and carried. The hold down shoe 222 is secured to the extremity of the shaft closest to the saw and a compression spring 230 positioned between the block 228 and the show. The opposite extremity of the shaft extends through the block and may be provided with an adjustable nut member 226 to control the point at which the shoe engages each blank for different saw diameters or blank diameters. In operation, the outermost extremity of the shoe 222 precedes the associated cutting saw in engagement with the blank, providing a resilient lateral clamping force on the blank prior to and increasing during the cutting operation of the saw.

FLUTING SAW STATIONS

Work stations 23, 25, 27 and 28 are provided respectively with rotary cutting saws 33, 35, 37 and 38 mounted on an appropriate reciprocating structure. Each of the fluting stations are substantially identical and thus only one station will be described in substantial detail. Upper fluting stations 23 and 25 differ from lower fluting stations 27 and 28 only in that the upper fluting stations dispose the cutting saws at a greater angle with respect to the axis of the screw than the angle at which lower fluting saws 37 and 38 are disposed.

Figure 18:
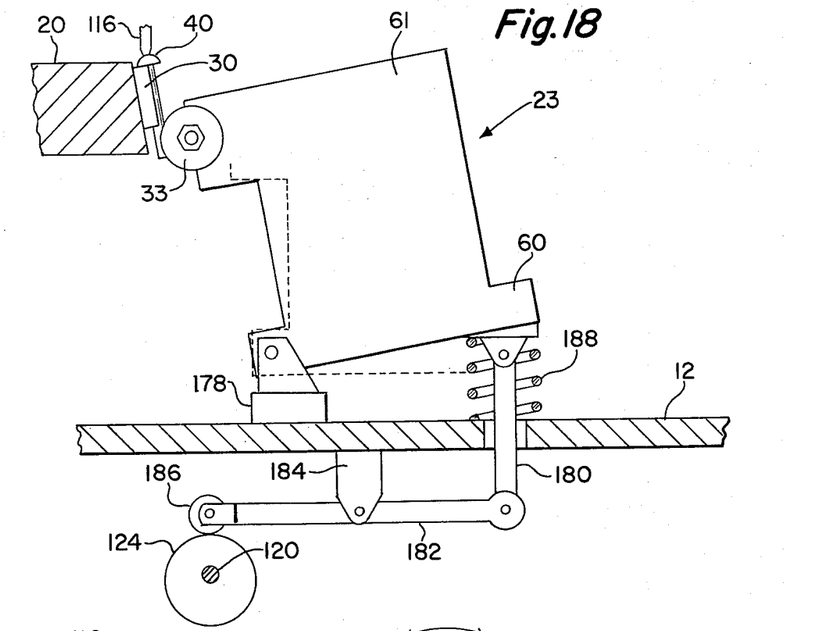
FIG. 18 is a schematic elevational view of a fluting station as taken in the direction of lines 18—18 of FIG. 11.

Fluting station 23, shown in schematic form in FIG. 18, includes basically a base 60 which is pivotally mounted to the table support 12 by a pivot bracket 178. The base 60 includes an upstanding support structure 61 which carries the spindle for rotary saw 33. The motor 62 is not shown in FIG. 18 since the means for mounting and operatively associating the motor with the saw is well known in conventional construction. It suffices to state that the motor will be structurally mounted to the base and will be movable therewith. The pivotally mounted base 60 enables the rotary cam 124 mounted on cam shaft 120 to effect the reciprocating motion of the saw into and out of cutting engagement with the blanks. A linkage 182 is pivotally mounted to a support structure by a bracket 184. One extremity of this pivot linkage carries a cam follower 186 and the other extremity is pivotally connected to an upstanding linkage 180 which is in turn pivotally secured to base 60 at a position laterally spaced from the pivot structure 178. A strong compression spring 188 is interposed between the base 60 and the support table 12 thus providing the force for moving the saw inwardly into cutting engagement with the blank during the dwell period of the turret 20, which is synchronous with the engagement of the cam follower 186 with the low profile on the cam 124. The engagement of the high profile of the cam 124 with the follower retracts the saw support structure 60 against the compressive force of the spring 188 to the position generally shown by the dotted line in FIG. 18. The profile of cam 124 should preferably be designed so that the infeed velocity of the saw is substantially constant during cutting to produce constant chip size. The infeed velocity should be reduced near the end of the stroke to provide a smooth cut and a dwell should be provided so that at least one full revolution of the saw is accomplished to cancel an effect the eccentricity of the saw may have on the cuts.

In order to facilitate accurate positionment of the saws, vertical and lateral adjustment means (not shown) may be provided at each fluting station using known construction for such means.

POINTING STATIONS

Figure 19:
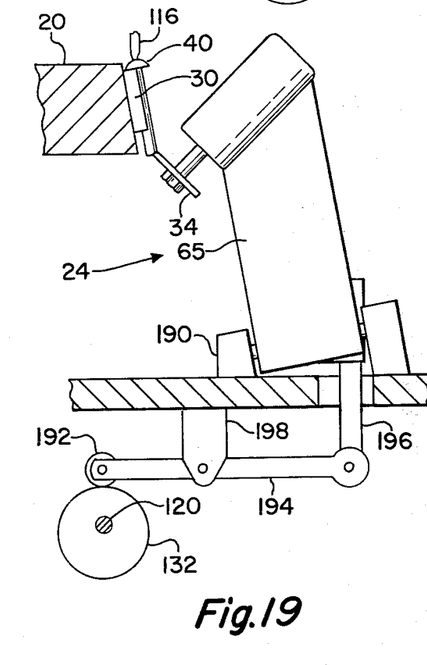
FIG. 19 is a schematic elevational view of a pointing station as taken in the direction of lines 19—19 of FIG. 11.
Figure 20:
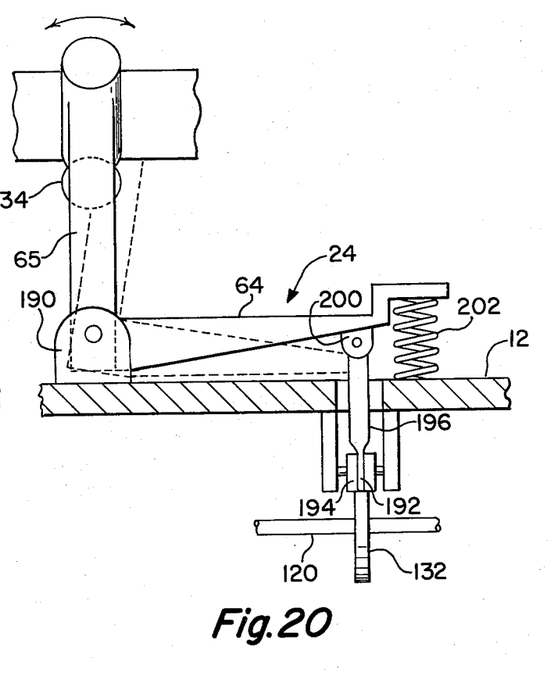
FIG. 20 is a schematic elevational view of a pointing station as taken in the direction of lines 20—20 of FIG. 11.
Figure 21:
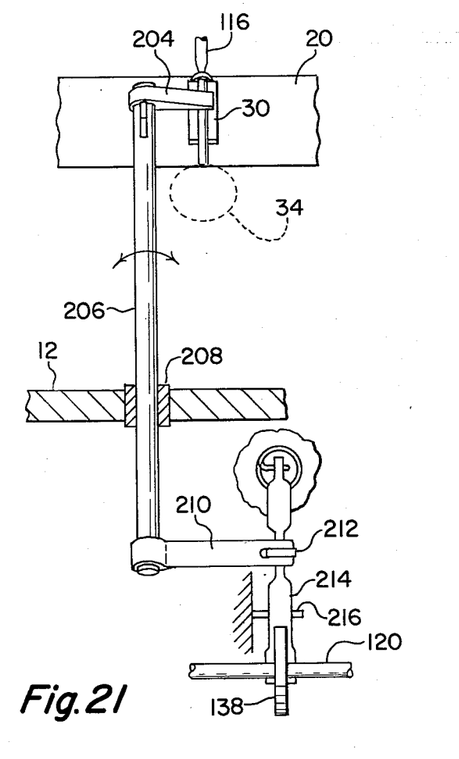
FIG. 21 is a schematic elevational view of a hold down mechanism at a pointing station as taken in the direction of lines 21—21 of FIG. 11.
Figure 22:
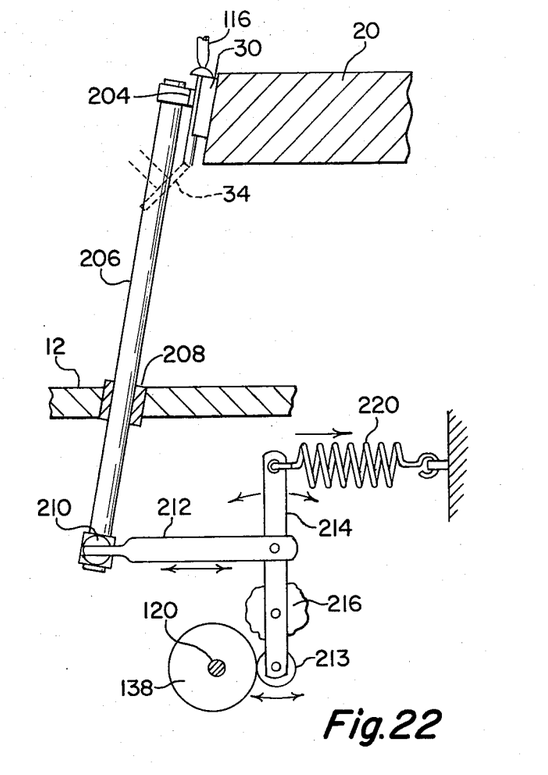
FIG. 22 is a schematic elevational view of the hold down mechanism of the point as taken in the direction of lines 22—22 of FIG. 11.

The two pointing stations 24 and 26 are shown schematically in FIGS. 19 and 20. Since the pointing saw stations are identical, only station 24 will be described in substantial detail. Each pointing station will include a support base 64 which is pivotally mounted to the work table 12 by a bracket 190. An upstanding support structure 65 mounts and carries the spindle for pointing saws 34 so as to dispose the saw at the precise angle required to create the desired beveled surface 48 at the extremity of the blank 40. The motor 66 is not shown in FIGS. 19 and 20 since the means for mounting and operatively associating a motor with a saw is well known in conventional construction. It suffices to state that the motor will be structurally mounted to the base and will be movable therewith.

As in the fluting stations, the pointing stations are timed to pivotally reciprocate into and out of cutting engagement with the path created by the turret 20. However, due to the cutting action desired at the pointing stations, they are configured to rock the saw structure back and forth into and out of tangential relationship with the work path. The rocking motion of the saw support structure is again controlled by a rotary cam 132 affixed to the commom cam shaft 120 and by a compressive spring 202 interposed between the support base 64 and the support table 12. Linkage 194 is pivotally mounted to a support bracket 198 to the fixed structure 12 and carries a cam follower 192 at one extremity and is secured to an upstanding linkage 196 at the other extremity. Linkage 196 is pivotally secured to the undersurface of support structure 64. Again it will be apparent that the low profile of the cam 132 is timed to occur during the dwell period of the indexing turret. At this moment, compression spring 202 forces the support structure 64 to pivot into cutting engagement with the blank 40. The support structure is in essence a bell crank type mechanism with base 64 extending in one direction from pivot 190 and saw support 65 extending in another direction. While the turret is being indexed from one dwell to the next, the higher profiles of the cam take effect and pull the support table 64 down, which in turn removes the cutting saw from engagement and from the rotary work path as shown in dotted lins of FIG. 20. The saw 34 passes the blank completely and waits for the turret to index to avoid cutting the same surface on its return stroke.

As in the fluting saw stations, the pointing saw stations may be provided with vertical and lateral adjustment means (not shown) to facilitate accurate positionment of the saws.

BLANK LOADING STATION

A succession of screw blanks 40 may be efficiently and synchronously loaded from a hopper (not shown) into successive pockets 30 on the turret with a feed track 56 and an escapement mechanism 58. The hopper and feeding track may be of various and known constructions and thus need not be described in detail herein. The escapement mechanism 58 is shown schematically in FIGS. 24–26.

Figure 24:
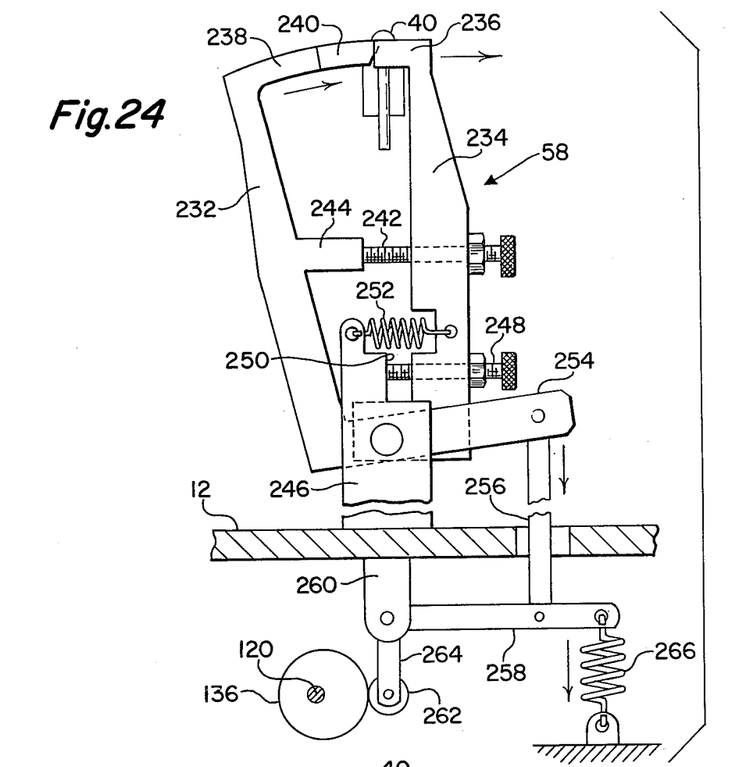
FIG. 24 is a schematic elevational view of the loading mechanism of the invention and as taken in the direction of lines 23—23 of FIG. 11.
Figure 25:
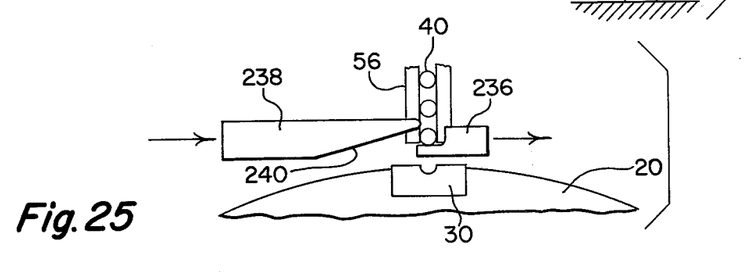
FIGS. 25 and 26 are top plan schematic views of the loading mechanism shown in FIG. 24 in a holdback and feeding position, respectively.
Figure 26:
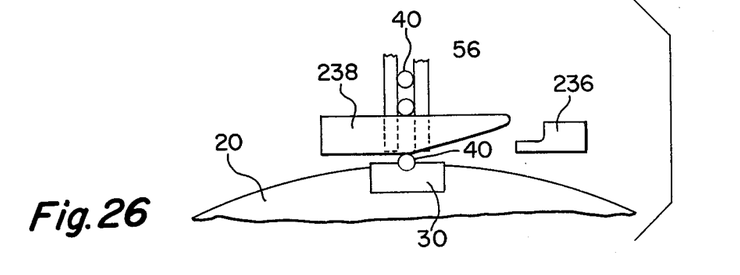

A feed lever 232 and hold back or gate lever 234 are each independently pivotally mounted to a common pivot bracket 246 on the table 12. The feed lever 232 comprises an uppermost feed finger 238 extending laterally of the upstanding lever, a foot 254 extending laterally in the same direction as the finger 238 and creating a bell crank arrangement in conjunction with lever 232. An intermediately positioned abutment surface 244 extends from lever 232 towards the opposing hold back lever 234. Hold back lever 234 includes a gate-like finger 236 at the uppermost extremity and which is positioned between the pocket 30 and the inwardly extending extremity of the feed finger 240. As shown in FIG. 25, the hold back finger is positioned to retain the blanks from moving into the rotary path until the escapement mechanism is activated by the rotary plate cam 136. At the dwell period of the turret, the low profile of cam 136 allows a tension spring 266 to pivot a bell crank element 264, 258 which carries a cam follower 262 at one arm extremity and pivotally carries an upstanding linkage 256 on the other arm adjacent the spring connection. Spring 266 is connected to a stationary structure, such as table 12, so that when the low profile of cam 136 is in interengagement with the cam follower 262 the spring creates a downward force on link 256 and thus the foot portion 254 of the feed lever. At this period in the cycle of the apparatus, the feed finger is pivoted clockwise as shown in FIG. 24. This pivotal movement causes the hold back lever 234 to move in the same direction through the engagement of the abutment surface 244 with adjustment screw 242. The motion of the hold back lever 234 is against the bias of a hold back spring 252 connected to pivot bracket 246. The relative lateral location of the hold back lever to the pivoting bracket when in the hold back mode of FIG. 25 is controlled by adjustable abutment screw 248. Likewise, the relative lateral location spacing between lever elements 232 and 234 and, in effect, the overlapping extent of camming surface 240 and pocket 236, is controlled by adjustment screw 242. At the dwell period of the turret, the camming surface 240 on finger 238 forces the next blank into the pocket 30 as shown clearly in FIG. 26.

Upon the return cycle, the gage member 236 will receive the next gravity fed blank for subsequent similar operations.

As suggested earlier, the driving spindle 16 must be retracted upwardly at the loading station 22 so the blanks may be properly seated in the pockets 30. Again referring to FIGS. 14 and 17, it will be seen that spindle 16 is resiliently urged upwardly into the slot 175 formed in the cam plate 14, permitting the free entry of the blanks into the pockets at loading station 22.

A blank removal station 29 is positioned between the loading station and the last fluting station 28. The structure of such an off-loading device is not shown as any variety of known construction for such devices can be utilized within the spirit and scope of this invention.

SUMMARY OF APPARATUS AND METHOD

The apparatus and method just described utilizes a rotary turret with a plurality of blank receiving pockets spaced dircumferentially about the periphery thereof. The blanks are clampingly retained from movement at each dwell period of the indexing turret. The blanks are also rotated about their own axes during movement from one dwell station to the next to accurately expose the appropriate blank peripheral surface to a rotary cutting station. A first generally longitudinally fluting cut is made on each side of the blank at a predetermined inclination relative to the axis of the blank. Second, lower, fluting cuts are made on each side of the blank at a different and lesser inclinations to the vertical axis of the blank than the first fluting cuts and longitudinally overlapping the first cuts. Pointing stations are located about the circular path to form intersecting flat beveled surfaces which cooperate with the fluting cuts in a known manner and create a properly designed drill point. The advantages of the method described by this invention are the capabilities of obtaining an effective flute length which is longer than prior art and yet provide a strong and carefully engineered point structure. The method just described also provides a highly versatile and efficient production apparatus for producing critically engineered drill screws which do not require a compromise of any parameters traditionally used to define the geometry of the drill screw.

The rotation of the uppermost fluting saws in a downward direction on the blank and the subsequent rotation of the lowermost fluting saws upwardly on the blank create a flute and cutting edge which is substantially free of burrs. In addition, the skew angle at which the fluting saws engage the blank produces a clean cut and lengthens the saw life by providing a clearance angle between the cutting edge and side of the saw and provides an intersection of flute surfaces at an angle of between 92° and 97° which is beneficial in reducing the drag on the drill screw.

While the apparatus has been described in substantially schematic form, it should be apparent from one skilled in the art that there are various well known constructions and engineering techniques which could be utilized to make the apparatus, but for purposes of clarity and ease and understanding, such details are not deemed necessary.

An advantageous feature of the structure described herein is the cam and spring relationships in each of the six sawing stations as well as the clamping mechanisms and hold down stations. Each of these cam activated stations and mechanisms utilize a resilient spring force to produce the working portion of the reciprocating stroke and utilizes the rigid mechanical cam to return the station or device out of operative engagement with the blanks. This will insure that jamming, cocking or other misalignment problems will not seriously damage or harm the elements comprising the apparatus.

It should be apparent that the angular relationship of the rake angles produced by the four fluting cuts may be varied to suit particular requirements and still be contemplated by this invention.

While the preferred embodiments of the present invention have been shown and described herein, it is obvious that many structural details may be changed without departing from the spirit and scope of the appended claims.

I claim:

1. In a method of producing screws of the self-drilling variety which includes a pair of oppositely disposed and inclined, relatively long flutes, by intermittently conveying successive screw blanks from a loading station along a single generally circular path for predetermined positioning at successive work stations where rotary cutting operations are performed on selected regions of exposed shank tip portions, including the steps of engaging rotary cutting means, at a work station adjacent the circular path, against a predetermined region of the shank adjacent the tip and forming a first slot portion in the shank, engaging rotary cutting means at another work station adjacent the circular path, against a second predetermined region spaced axially from said first predetermined region and forming a second slot portion in the shank merging with the first slot portion and thereby configuring a single substantially continuous flute in one side of the shank tip of the screw blank.

2. In a method of making screws having a pointed entering end portion and oppositely disposed inclined slots intersecting said end portions by intermittently conveying successive screw blanks into engagement with rotary cutting means at successive work stations along a generally circular predetermined path for progressively shaping the shank end portions into the desired configuration, including the steps of forming, at a first predetermined work station, a first generally longitudinal slot in the shank inclined at a predetermined angle to the axis of the shank, forming, at a second predetermined work station, a second generally longitudinal slot in a peripheral region of the shank opposing said first slot and at substantially said predetermined angle of inclination, forming, at third and fourth predetermined work stations, respectively, longitudinal slot extensions toward the end of each shank intersecting and merging with the first and second slots, said slot extensions being formed at an angle of inclination to the axis which is less than the predetermined angle of inclination, forming at other predetermined work stations, beveled intersecting surfaces at the extremity of the shank, each beveled surface adapted to intersect associated slot extensions thus providing a pair of cutting edges.

3. The method of claim 2, wherein the slots are formed at each work station with rotary cutting saws, the rotary cutting saws at said first and second work stations being rotated in a first rotary direction with the teeth of the saws cutting downwardly on the shanks, the rotary cutting saws at said third and fourth work stations being rotated in a second rotary direction, opposite to said first rotary direction, with the teeth of the saws cutting upwardly on the shanks.

4. In a method of making screws having a pointed entering end portion and oppositely disposed slots intersecting said end portions including the steps of intermittently conveying successive screw blanks to successive work stations along a predetermined path for progressively shaping the shank end portions into the desired configuration including the steps of forming a first, generally longitudinal slot in the shank at a first work station, forming a second, generally longitudinal slot, opposing said first slot, at a second work station, forming, at subsequent work stations, longitudinal continuations of said first and second generally longitudinal slots, shaping the extremity of the shank to form a pair of substantially equally configured intersecting beveled surfaces, each beveled surface arranged to intersect a corresponding longitudinal slot continuation thereby providing a pair of cutting edges.

5. In a method forming a shank tip of a self-drilling fastener device, the steps comprising; feeding a fastener blank into a predetermined generally circular path of travel, positioning a plurality of work stations adjacent to the path and at circumferentially spaced intervals of 30° or multiples thereof about the path, contacting the heads of the blanks with a blank holding and rotating device upon entry of the blank into the predetermined path, rotating the blank about its axis an amount greater than 360° in a given direction as the blank travels from its point of entry on the path to a first of said plurality of work stations, securing the blank from rotation about its axis while engaging the shank portion of the blank with cutting means at said first work station, moving the fastener blanks to each successive work station along the path while rotating the blank about its axis 300° in said given direction as the blank travels between each 30° interval on the circular path, securing the blank from rotation about its axis while engaging predetermined shank portions of the blank with cutting means at each successive work station.

6. An improved method of forming flutes in self-drilling screw blanks including the steps of: conveying successive screw blanks to successive work stations along a first predetermined path, retaining each screw blank from movement so that the entering end of the blank and a predetermined shank region adjacent the end are exposed to at least a first of said work stations with a first plane extending through the axis of the blank intersecting said path and said first work station and disposed substantially vertical to said path, mounting, on a supporting structure at said first work station, a rotary saw including a central axis of rotation, generally planar side surfaces and cutting teeth on a peripheral edge surface, reciprocating said supporting structure so that the cutting saw is moved into and out of cutting engagement with said blank, said reciprocating movement of the support structure being along a second predetermined path intersecting said first path, said rotary cutting saw mounted to be disposed to an acute angle relative to a radial plane and in a radial direction to one side of said first plane, cuttingly engaging said blank with said saw substantially on said one side of the first plane so that a relief angle is formed between one side surface of the saw blade and one surface of the flute being cut in the blank.

* * * * *